(12) United States Patent
Needham (10) Patent No.: US 7,248,285 B2
(45) Date of Patent: Jul. 24, 2007

(54) METHOD AND APPARATUS FOR AUTOMATIC PHOTOGRAPH ANNOTATION

(75) Inventor: Bradford H Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 09/822,925

(22) Filed: Mar. 30, 2001

(65) Prior Publication Data

US 2004/0201676 A1 Oct. 14, 2004

(51) Int. Cl.
*H04N 5/225* (2006.01)
*H04N 7/00* (2006.01)
*H04N 11/00* (2006.01)

(52) U.S. Cl. .............. 348/207.1; 348/207.11; 348/552

(58) Field of Classification Search ............ 348/207.1, 348/231.2
See application file for complete search history.

(56) References Cited

U.S. PATENT DOCUMENTS

| | | | |
|---|---|---|---|
| 5,296,884 A * | 3/1994 | Honda et al. ............... 396/311 |
| 5,732,401 A * | 3/1998 | Conway ....................... 705/29 |
| 5,745,126 A * | 4/1998 | Jain et al. .................... 382/154 |
| 6,396,537 B1 * | 5/2002 | Squilla et al. .............. 348/239 |
| 6,470,264 B2 * | 10/2002 | Bide .......................... 701/207 |
| 6,507,371 B1 * | 1/2003 | Hashimoto et al. ......... 348/552 |
| 6,567,122 B1 * | 5/2003 | Anderson et al. ......... 348/211.3 |
| 6,608,563 B2 * | 8/2003 | Weston et al. ........... 340/573.1 |
| 6,623,528 B1 * | 9/2003 | Squilla et al. .............. 715/523 |
| 6,809,749 B1 * | 10/2004 | Chen et al. ................. 715/753 |
| 6,914,626 B2 * | 7/2005 | Squibbs ................... 348/231.3 |
| 7,005,968 B1 * | 2/2006 | Bridgelall ................ 340/10.42 |
| 2002/0072922 A1 * | 6/2002 | Suzuki et al. ................. 705/1 |
| 2002/0088000 A1 * | 7/2002 | Morris ....................... 725/105 |
| 2002/0101519 A1 * | 8/2002 | Myers ........................ 348/232 |

* cited by examiner

*Primary Examiner*—Vivek Srivastava
*Assistant Examiner*—Yogesh Aggarwal
(74) *Attorney, Agent, or Firm*—Sanjay S. Gadkari (57) ABSTRACT

A system, apparatus and method for automatically annotating digital images. An electronic capture device captures a digital representation of a scene. An information tag device is utilized to store identification data for identifying the scene. A tag-reader receives the identification data from the information tag device. A database stores information for the information tag device. A communication device communicates with the database. When identification data is transmitted to the database, information for an annotation provider is transmitted from the database to the communication device. A program executed by the communication device controls communication of the identification data with the database.

27 Claims, 8 Drawing Sheets

METHOD AND APPARATUS FOR AUTOMATIC PHOTOGRAPH ANNOTATION

BACKGROUND OF THE INVENTION

1. Field of the Invention

This invention relates to the field of photograph annotation, and, more specifically, to a system, method, and apparatus for automatically annotating digital photographs based upon identification information stored within an information tag device located near a site at which a photograph was taken.

2. Background of the Invention

There are digital cameras and personal digital assistants ("PDAs") that allow a user to add annotations to photographs. For example, some digital cameras allow a user to type in an annotation/caption for a photograph immediately after the photograph has been taken. However, when a user takes many pictures, it is very burdensome for the user to manually write/type a caption for each photograph.

Some digital cameras utilize a global positioning system ("GPS"). GPS can be used to determine the latitude and longitude coordinates of the location where a photograph was taken. Some cameras can annotate photographs with GPS coordinates. However, if several photographs are taken at different sites at around the same latitude/longitude coordinates, the user might not remember which photographs were taken at which site. Also, GPS does not work at all indoors—it requires an unobstructed view of the sky. GPS can sometimes also take a relatively long time to pinpoint the user's location.

DETAILED DESCRIPTION

The preferred embodiment of the present invention is a system for automatically annotating photographs taken by a digital camera. The user may take a photograph of anything near an information tag device, the information tag device being a small device for holding identification information concerning the location of the information tag device or of a nearby scene of interest, such as latitude/longitude coordinates or the like. The camera acquires the identification information from the information tag device when the user controls the camera to "read", or acquire the information from, the information tag device through the use of a tag-reader. The information stored within the information tag device is utilized to acquire annotation information from an annotation provider over a network, such as the Internet, for example.

Figure 1:
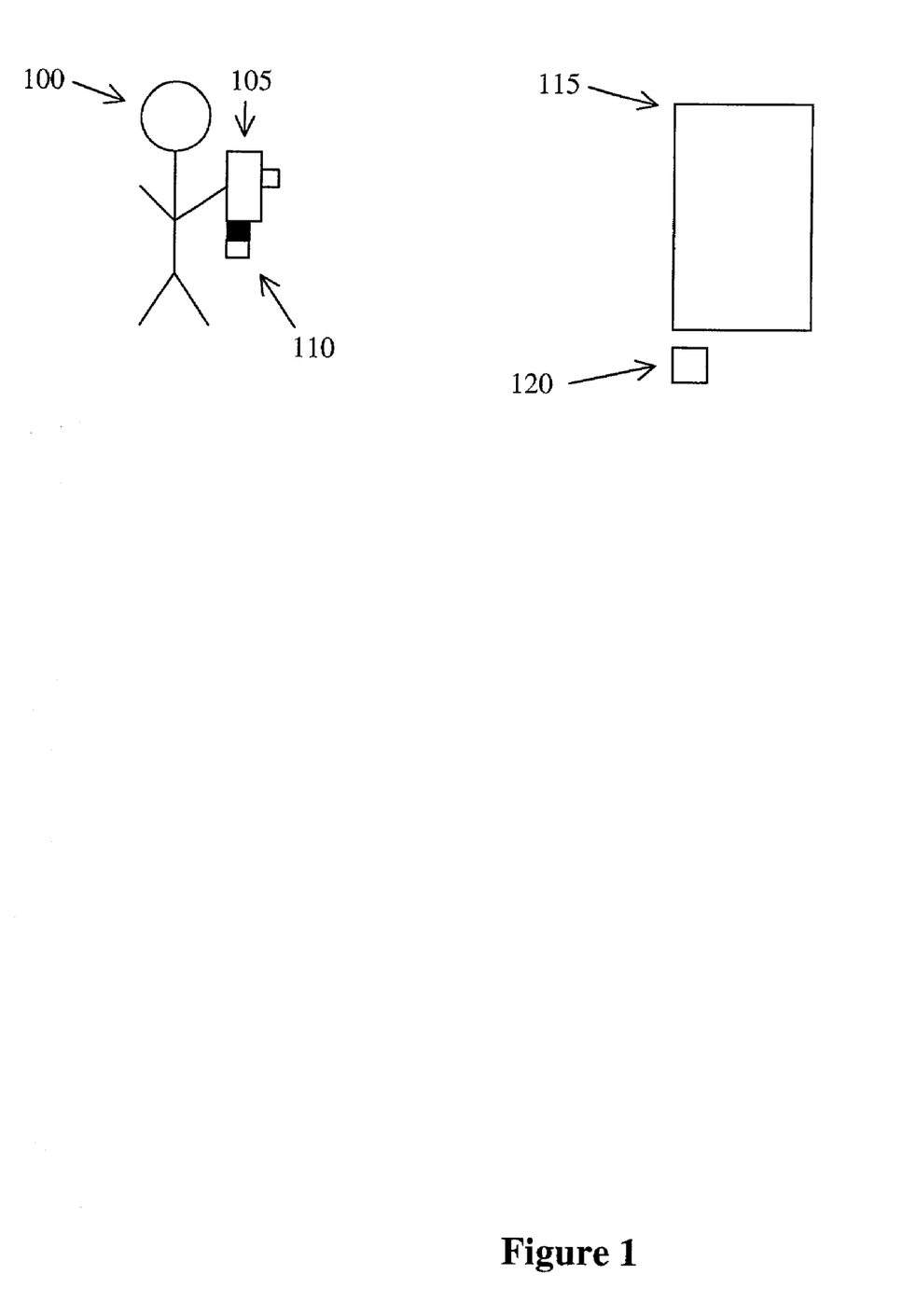
FIG. 1 illustrates a user taking a photograph of a site near an information tag device according to an embodiment of the invention.

FIG. 1 illustrates a user 100 taking a photograph of a scenic place 115 near an information tag device 120 with a camera 105 according to an embodiment of the invention. In the preferred embodiment, unique identification information is stored within the information tag device 120. The camera 105 has a tag-reader 110, for reading the identification information stored in and transmitted by the information tag device 120. In the preferred embodiment, the tag-reader 110 is physically a part of the camera 105. In other embodiments, the tag-reader 110 and the camera 105 may be separate devices. In other embodiments, a camera 105 for taking still photographs need not be used. For example, a video camera, an audio recorder, or any other suitable device may be used.

In the preferred embodiment, the information tag device 120 is a Radio Frequency Identification (RFID) tag, and the tag-reader 110 is an RFID tag reader. RFID is a data collection technology that utilizes a electronic tag device 120 to store identification data and a wireless transmission method to capture data from the tag device 120. A small RFID tag device 120 can be a small semiconductor chip in which 2 kilobits of data are stored, for example. The semiconductor chip can be a memory such as a random access memory (RAM), an electrically erasable programmable read only memory (EEPROM), a flash memory, or the like.

The preferred embodiment utilizes a "passive" RFID technology, in which the RFID tag-reader 110 transmits a high frequency signal that is received by the RFID information tag device 120. A typical frequency of the high frequency signal is 13 MHz, an international standard.

The RFID information tag device 120 is a small semiconductor attached to a coil antenna. The RFID information tag device 120 is typically small, around one or two inches square. The RFID information tag device 120 can usually be affixed to any non-metallic material. When the RFID tag-reader 110 transmits a high-frequency signal to the information tag device 120, the signal provides energy to "turn on" the information tag device 120. In other words, the high-frequency signal from the RFID tag-reader 110 is used to power the RFID information tag device 120. Once the RFID information tag device 120 has power, it transmits a signal to the tag-reader 110. The identification information stored in its memory is transmitted in the signal. For an RFID information tag device 120 that is an inch or two in diameter, the RFID tag-reader 110 must be close in proximity to the RFID information tag device 120 during data transmission, because the read range is just a couple of inches.

In other embodiments, an "active" RFID information tag device 120 is utilized. An active RFID information tag device 120 has its own power source, such as a battery. An active information tag device 120 does not require a high frequency signal from an RFID tag-reader 110 to supply power for transmitting data. The active information tag device 120 has more transmitting power than the passive information tag device 120, and can be read from a distance of a few meters, for example. In one embodiment, an active information tag device 120 may continuously transmit a signal containing the identification information stored in the information tag device 120. In another embodiment, the active information tag device 120 may transmit a signal containing the identification information stored in the information tag device 120 only after the RFID tag-reader 110 transmits a signal to the information tag device 120, the signal causing the information tag device 120 to begin data transmission.

In an RFID embodiment, the identification information stored in the information tag device 120 may be the positional location of the information tag device 120. This positional data may be the latitude and longitude coordinates of the information tag device 120. In other embodiments, the data stored in the memory in the information tag device 120 may be American Standard Code for Information Interchange (ASCII) characters corresponding to a description or location of the site at which the information tag device 120 has been placed. For example, a information tag device 120 located near Old Faithful in Yellowstone National Park could contain the ASCII characters "OLD FAITHFUL".

In other embodiments, technology other than RFID may be employed. For example, in an alternative embodiment, the information tag device 120 may be a barcode, and the tag-reader 110 could be a barcode reader. The barcode reader may be a laser diode scanner, which emits laser beams at a barcode and extracts information from the bar code based upon reflected laser beams.

Alternatively, the information tag device 120 may be a digital watermark. An operator or owner of a museum or a poster in the museum may add a digital watermark to the poster The digital watermark may be a non-random pattern embedded within, or superimposed on top of, the poster. The non-random pattern contains information identifying its location. Such a non-random noise pattern is not noticeable to the user's eye. However, a photograph is taken of a poster having such a non-random pattern, would contain an image of the poster with the non-random pattern. When the image is processed, the non-random pattern may be extracted from the photograph and identification information recorded therein may be determined.

Another embodiment utilizes a Global Positioning System (GPS). In a GPS system, an information tag device 120 is not required. Instead, through the use of the GPS system, the tag-reader 110 pinpoints the location of the user 100 when a photograph is taken.

An additional embodiment may read an information tag device 120 via infrared signals. The information tag device 120 in an infrared embodiment may actively transmit a signal that is readable by a tag-reader 110 in the camera 105.

Figure 2A:
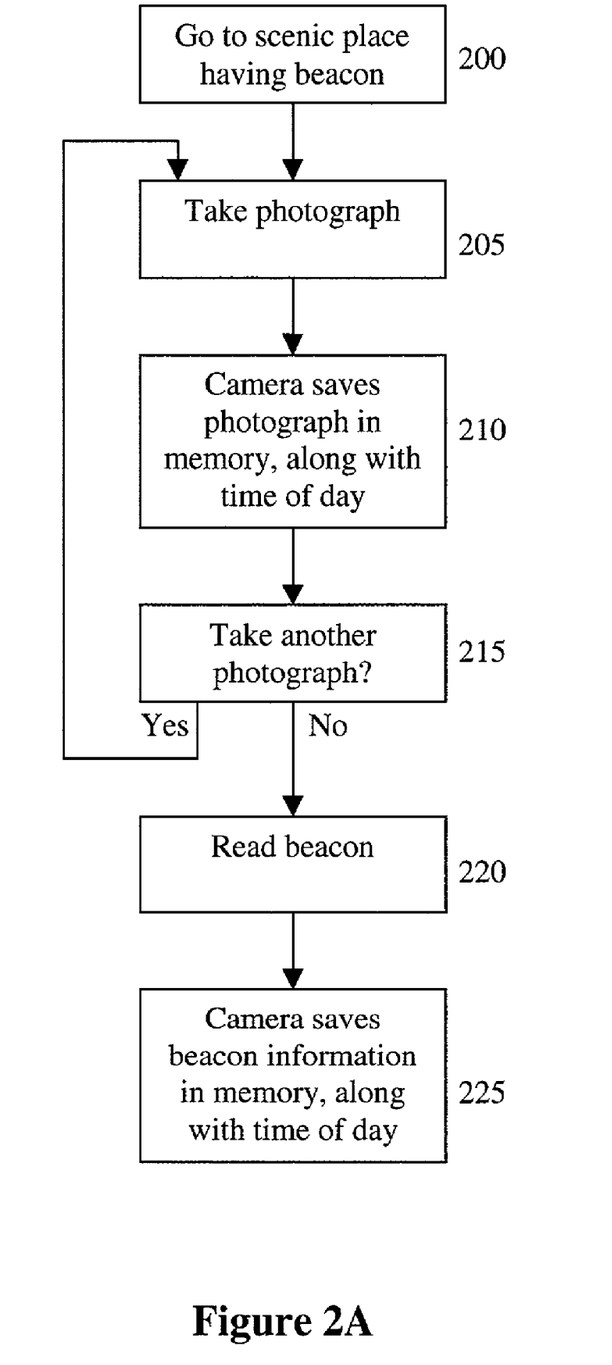
FIG. 2A illustrates a process of the user taking photographs and then utilizing a tag-reader to read the information tag device according to an embodiment of the invention.

FIG. 2A illustrates a process of the user 100 taking photographs and then reading an information tag device 120 according to an embodiment of the invention. First, the user 100 brings 200 a camera 105 to a place having an information tag device 120. Next, the user 100 takes 205 a photograph with the camera 105. The camera 105 saves 210 the photograph in a memory, preferably along with the time that the photograph was taken. In the preferred embodiment, a real-time clock is stored within the camera 105. In other embodiments, a stopwatch-type device or program may be used to calculate a time difference between when the last photograph was taken and when the current photograph is taken. The user 100 may then take 215 another photograph, if desired. The user 100 may continue taking photographs until the user 100 desires to move to a new location. If additional photographs are taken, the same process is repeated, with respect to the taking and saving of photographs.

When the user 100 has finished taking photographs of the scene 115, the user 220 may "read" the information tag device 120 with the tag-reader 110. After the information tag device 120 has been read, the camera 105 saves 225 the information from the information tag device 120 in a memory in the camera 105, along with the time of day that the information tag device 120 was read.

Figure 2B:
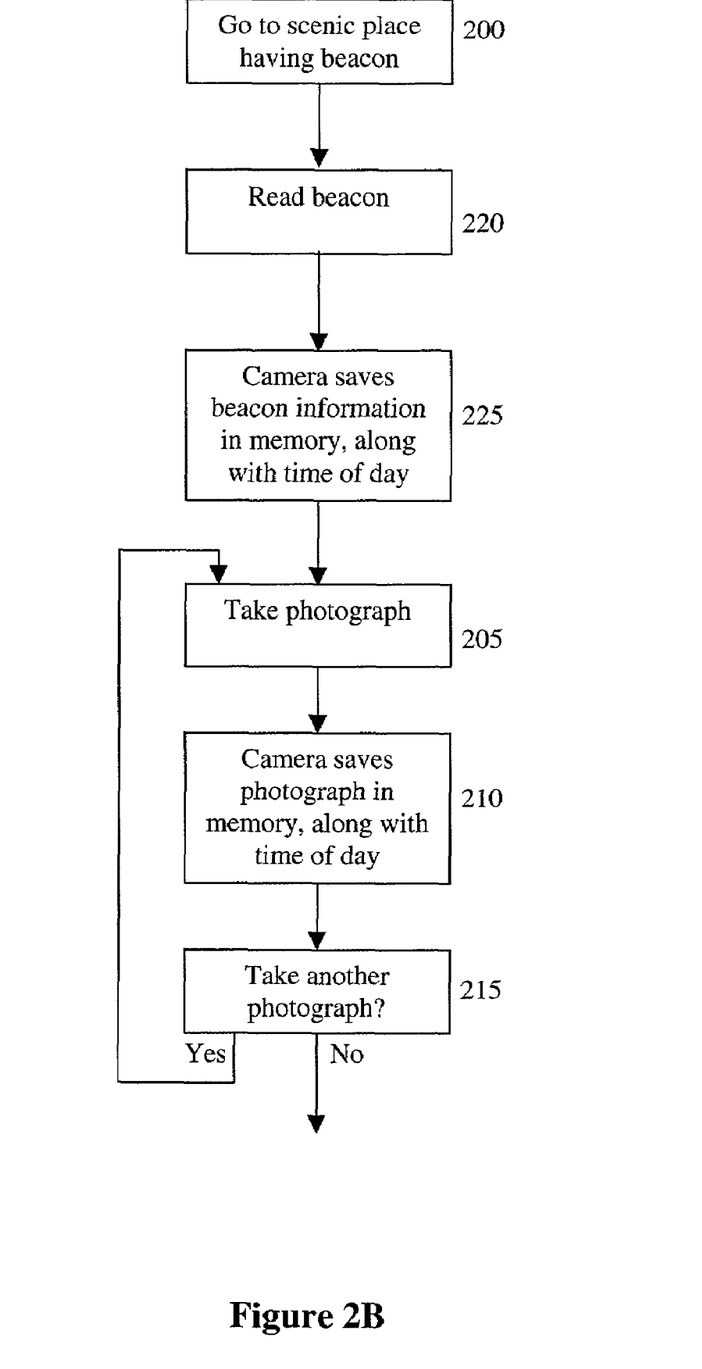
FIG. 2B illustrates a process of the user utilizing a tag-reader to read the information tag device and then taking photographs according to an embodiment of the invention.

FIG. 2B illustrates the process of the user 100 reading an information tag device 120 and then taking photographs according to an embodiment of the invention. The process described in FIG. 2B differs from that shown in FIG. 2A only in that in FIG. 2B, the user 100 first reads 220 the information tag device 120 before taking 205 any photographs.

In an additional embodiment, the user 100 may take 205 pictures, read 220 the identification tag device 120, and then continue taking more pictures 205 of the same scenery.

Figure 3:
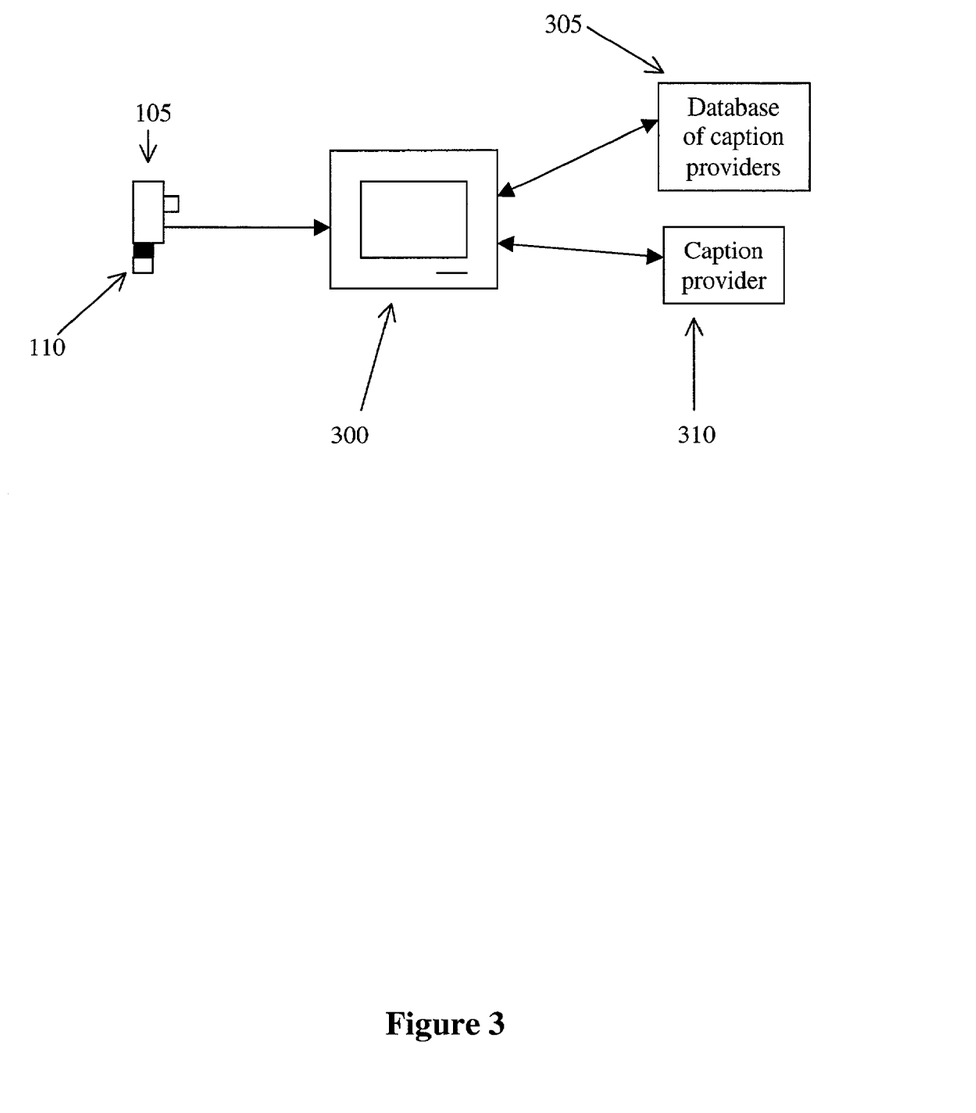
FIG. 3 illustrates a general overview of digital photographs being transferred from a camera and acquiring annotations according to an embodiment of the invention.

FIG. 3 illustrates a general overview of digital photographs being transferred from the camera 105 and acquiring annotations according to an embodiment of the invention. As shown, the camera 105 is connected to a computer 300. A program executed by the computer 300 is preferably used to determine which photographs were taken near which information tag devices 120.

The computer 300 may contact a database of caption providers 305. In the preferred embodiment, the information read from the information tag device 120 is used to locate a provider of captions for that information tag device 120. When an information tag device 120 is read, a unique number, preferably stored therein, is saved in memory of the camera 105. When the camera 105 is connected to the computer 300, this number is transmitted to the database of caption providers 305, which then returns an Internet website address, or the like, of a caption provider for the particular information tag device 120. A program may be executed by the computer 300 to automatically open a browser pointed to the caption provider's website 310, and the user 100 may acquire the captions for the photographs (to be further discussed below).

Figure 4:
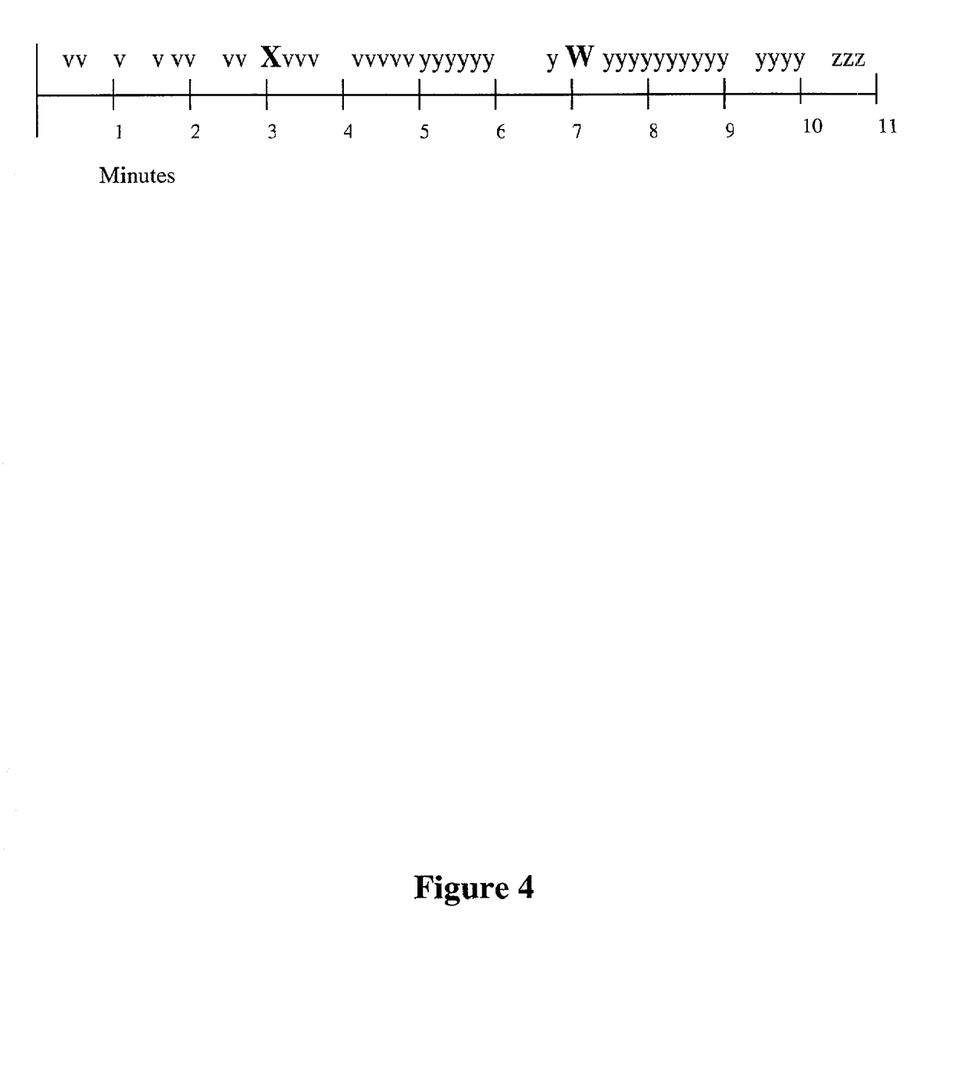
FIG. 4 illustrates a timeline showing when photographs were taken and when two information tag devices were read according to an embodiment of the invention.

FIG. 4 illustrates a timeline showing when photographs were taken and when two information tag devices 120 were read according to an embodiment of the invention. X and W denote the time at which two separate information tag devices 120 were read. Times at which photographs were taken are represented by "v", "y" and "z". In an embodiment where photographs were taken over an 11-minute time span, a program executed by the computer 300 determines which photographs were taken near each information tag device 120. In a program designed so that all photographs taken within 3 minutes of an information tag device 120 being read, for example, are associated with that information tag device 120, the photographs represented by "y" taken between the 6th and 10 minute are associated with information tag device 120 W. The photographs represented by "z" taken between the 10th and 11th minutes are not associated with either information tag device 120 X or W, because they were taken more than 3 minutes after X and W were read. In alternative embodiment, another suitable timing parameter may be utilized. However, any other suitable method of associating photographs with tag devices 120 may be utilized.

In this example, information tag devices 120 X and W were read less than 6 minutes apart, and some photographs were taken within 3 minutes of each information tag device 120 being read. In such instances, the program may be configured so that the photographs are associated with the information tag device 120 read within the smallest time interval. In this case, the photographs represented by "y" taken between the 5th and the 7th minute are associated with information tag device 120 W because they were taken closer in time to W being read than X being read. Similarly, the photographs represented by "v" taken between the 3rd and the 5th minute are associated with information tag device 120 X because they were taken closer in time to X being read than W being read. Also, the photographs represented by "v" taken during the 1st minute the 3rd minute are associated with information tag device 120 X because they were taken within 3 minutes of X being read.

Figure 5:
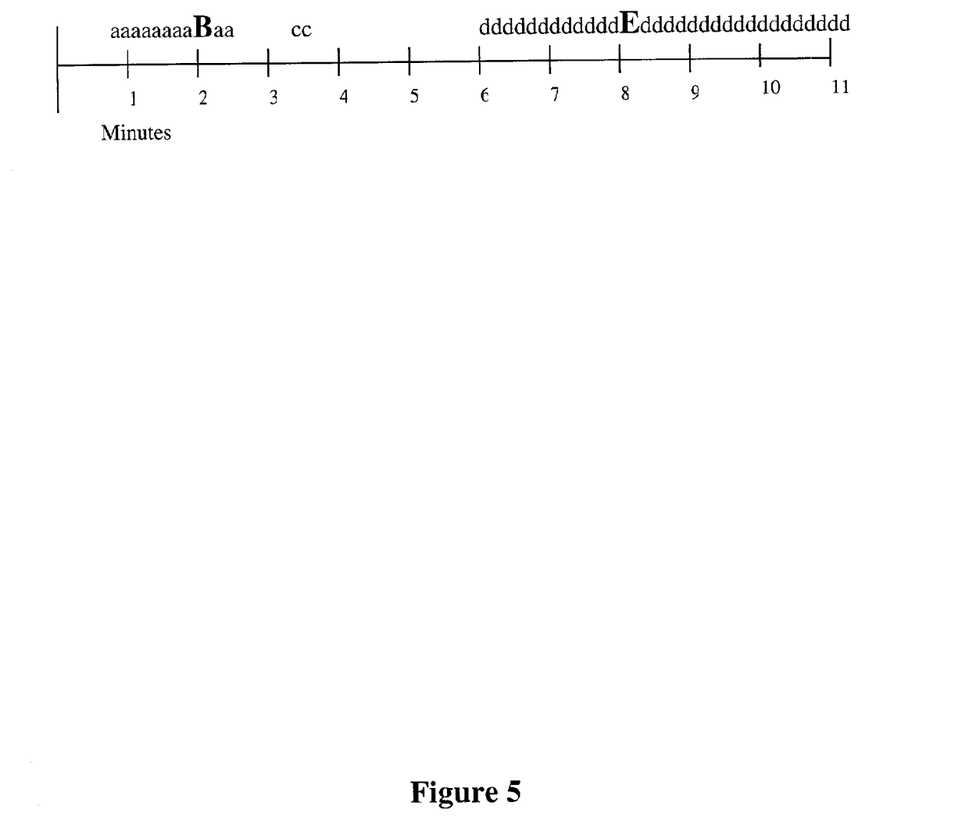
FIG. 5 illustrates a second timeline showing when photographs were taken and when two information tag devices were read according to another embodiment of the invention.

FIG. 5 illustrates a second timeline showing when photographs were taken and when two information tag devices 120 were read according to another embodiment of the invention. In this embodiment, the program does not associate photographs with information tag devices 120 based upon a predetermined time threshold. Instead, the program looks for "clusters" of photographs being taken and assumes that all of the photographs in a cluster were taken near the same information tag device 120. The program looks for clusters of photographs taken around the time that an information tag device 120 is read. As shown in FIG. 5, the photographs represented by "a" are associated with information tag device 120 B. The photographs represented by "d" are associated with information tag device 120 E. The photographs represented by "c" are not associated with information tag device 120 B or E, since they are not located in a cluster. A "cluster" is generally a group of photographs taken around the time that an information tag device 120 is read. Clusters are determined by the amount of time elapsing between an information tag 120 being read and photographs being taken. The amount of time elapsing between photographs being taken is also considered when locating each cluster of photographs.

As shown in FIG. 5, the photographs represented by "c" were taken closer in time to information tag device 120 B being read than the time between some of the photographs represented by "d" (specifically, those taken after the 10th minute) being read and information tag device 120 E being read. However, all of the photographs represented by "d" are associated with information tag device 120 E because they are clearly clustered around that information tag device E 120. Conversely, the photographs represented by "c" are not associated with information tag devices 120 B or E because there was a gap of time between when those photographs were taken and when the "a" and "d" photographs were taken. In other words, the photographs represented by "c" are not clustered around either information tag devices 120 B or E.

Figure 6:
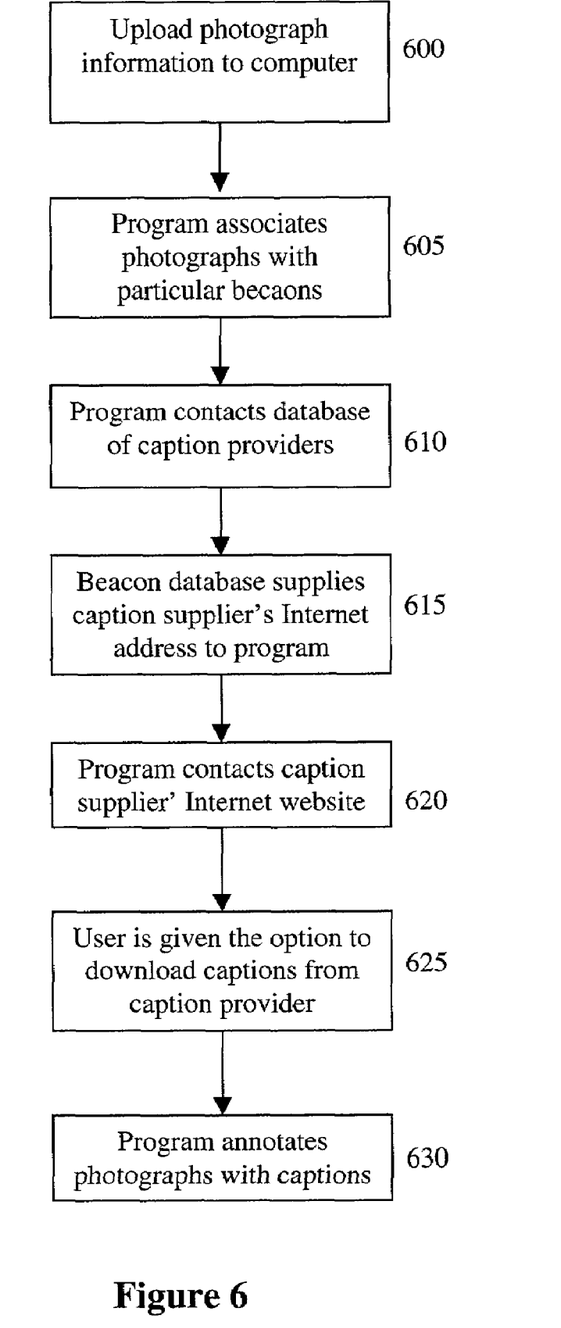
FIG. 6 illustrates a process by which digital photographs receive annotations according to an embodiment of the invention.

FIG. 6 illustrates a process by which digital photographs receive annotations according to an embodiment of the invention. First, the user 100 uploads 600 the photograph information to the computer 300 (as discussed above with respect to FIG. 3). Next, the program associates 605 photographs with particular information tag devices 120. The program, or another program, contacts 610 the database of caption providers 305. The database of caption providers supplies 615 the caption provider's 310 network address or Internet address to the program. The program then contacts 620 the caption provider's Internet website. For example, at the caption provider's 310 Internet website, the user 100 is provided the option of downloading 625 captions from the caption provider 310 relating to an information tag device 120. After the user 100 chooses a caption, the program annotates 630 the photographs with the selected captions.

In the preferred embodiment, the caption provider 310 provides the user 100 with at least two caption choices. The first choice is to get a free basic caption listing the name of the place where the photograph was taken. In such an instance, the provider could put advertising underneath the caption of the photograph. The second choice is for the user to pay a fee, such as a flat $5 fee for 100 captions, for example. The user 100 would then receive detailed captions, with information similar to what might be found in a guidebook. Also, the user 100 would not have any advertising placed within the caption.

Figure 7:
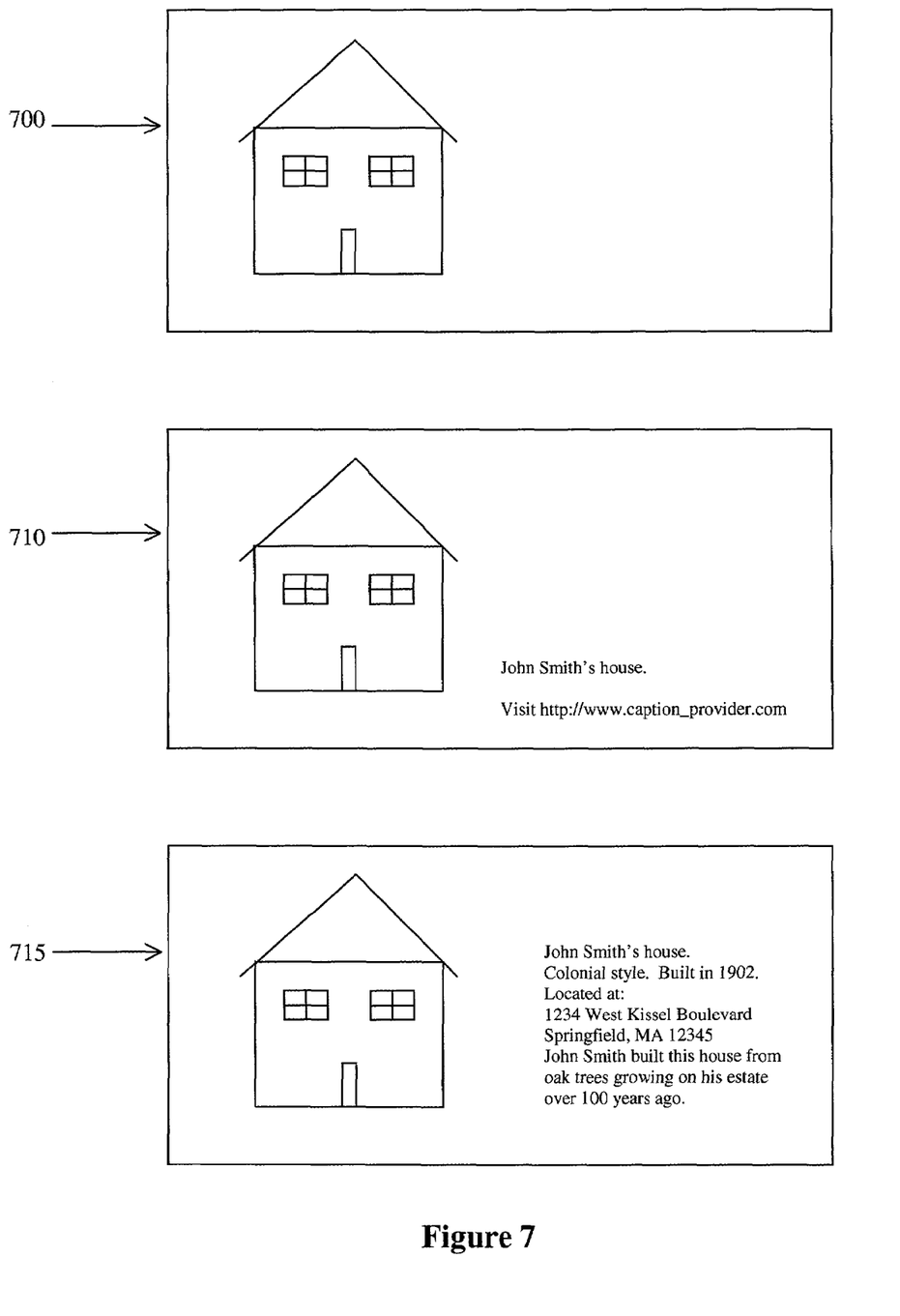
FIG. 7 illustrates a digital photograph to which two different annotations have been added according to an embodiment of the invention.

FIG. 7 illustrates a digital photograph to which two different annotations have been added according to an embodiment of the invention. First, the user 100 takes a photograph 700 of a house, for example. Next, the user 100 is given the choice of the free basic caption or the more detailed caption that costs money. If the user chooses the free caption, the annotated photograph 710 lists the name of the photographed scene plus advertising. In this example, the caption is "John Smith's house." The advertising is "Visit http://www.caption_provider.com".

Alternatively, the user 100 may choose to pay for the caption. The annotated photograph 715 reads:
John Smith's house.
Colonial style. Built in 1902
Located at:
1234 West Kissel Boulevard
Springfield, Mass. 12345
John Smith built this house from oak trees growing on his
  Estate over 100 years ago.

In other embodiments, more than two caption options may be presented to the user 100. Also, instead of being automatically directed to one caption provider, the user 100 may be given the option of choosing between caption providers for a particular information tag device 120. In other embodiments, the caption information may be contained totally within the information tag device 120. In such a case, it is not necessary to access the database of caption providers 305 and choose from options at the caption provider's 310 Internet website. Alternatively, the network address or Internet website address of the caption provider 310 may be stored within the information tag device 120, rather than simply a number that has to be matched with the caption provider's network address or Internet website at the database of caption providers 305.

The description above has mainly described embodiments in which the source of data is an RFID tag and the tag reader 120 is an RFID tag reader. However, any of the following technologies are also suitable:

| Source of data | Data reader |
| --- | --- |
| Plurality of GPS satellites | GPS receiver |
| Infrared transmitter | Infrared receiver |
| RFID tag | RFID tag reader |
| Barcode tag | Barcode reader |
| A printed image having a digital watermark | Imaging device that records the printed image, coupled with digital watermark extractor |
| Radio transmitter | Radio receiver |

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention of claimed is:

1. A system for automatically annotating a digital representation, comprising:
    an electronic capture device to capture the digital representation of a scene;
    a plurality of information tag devices, each of the information tag devices dispersed at various locations of scenes to store identification data for identifying the locations of the scenes;
    a tag-reader to receive the identification data from an information tag device;
    a database to store annotation provider information for each of the information tag devices;
    a communication device to communicate with the database, wherein when the identification data is transmitted to the database, a network address for an annotation provider associated with the information tag device is transmitted from the database to the communication device; and
    a program to be executed by the communication device, the program to enable communication with the annotation provider to obtain an annotation associated with the information tag device and to annotate the digital representation of the scene with the annotation.

2. The system of claim 1, wherein the communication device is a computer.

3. The system of claim 1, wherein the communication device is part of the electronic capture device.

4. The system of claim 1, wherein the communication device further includes a processing device, the processing device being utilized to associate the captured digital representation with a particular identification tag device.

5. The system of claim 1, wherein the electronic capture device is a camera.

6. The system of claim 1, wherein the tag-reader is located within the electronic capture device.

7. The system of claim 1, wherein when the network address of the annotation provider is received by the communication device, the program contacts the annotation provider's network address, and at least one annotation option is provided to a user.

8. The system of claim 1, wherein the network address is an Internet address.

9. A method of automatically annotating a digital representation, comprising:
    capturing the digital representation of a scene;
    receiving identification data from an identification tag device located at the scene, the identification data identifying a location for the scene;
    communicating with a database, wherein the database is utilized to store caption provider information for the identification tag device, and when the identification data is transmitted to the database, the caption provider information is transmitted from the database to a communication device;
    executing a program, wherein the program enables communication with the caption provider to obtain a caption associated with the location of the scene and annotate the digital representation of the scene with the caption.

10. The method of claim 9, wherein the communication device is part of the electronic capture device.

11. The method of claim 9, further including associating the captured digital representation with a particular information tag device.

12. The method of claim 9, wherein the capturing of the scene is performed with a camera.

13. The method of claim 9, wherein the caption provider information stored in the database includes a network address of the caption provider.

14. The method of claim 13, wherein when the network address of the caption provider is received by the communication device, the program contacts the caption provider's network address, and at least one annotation option is provided to a user.

15. The method of claim 13, wherein the network address is an Internet address.

16. The method of claim 11, wherein associating the captured digital representation with a particular information tag device comprises associating the captured digital representation with the particular information tag device based upon a predetermined time threshold.

17. An apparatus for automatically annotating a digital representation, comprising:
    an electronic capture device to capture a digital representation of an object;
    a tag-reader to retrieve identification data from an identification tag device located at the object, wherein the identification tag device is utilized to store the identification data identifying a location of the object;
    a communication device to communicate with a database, wherein the database is utilized to store information for the identification tag device, and when identification data is transmitted to the database, information for an annotation provider is transmitted from the database to the communication device, wherein the information includes a network address of the annotation provider of annotations for the object.

18. The apparatus of claim 17, wherein the communication device is part of the electronic capture device.

19. The apparatus of claim 17, wherein the communication device further includes a processing device, the processing device being utilized to associate the captured digital representation with a particular information tag device.

20. The apparatus of claim 17, wherein the electronic capture device is a camera.

21. The apparatus of claim 17, wherein the tag-reader is located within the electronic capture device.

22. The apparatus of claim 17, wherein the network address is an Internet address.

23. The apparatus of claim 17 wherein the communication device executes a program, wherein the program to enable communication with the annotation provider to obtain an annotation associated with the information tag device and to annotate the digital representation of the object with the annotation.

24. The apparatus of claim 17, wherein when the network address of the annotation provider is received by the communication device, the program contacts the annotation provider's network address, and a user of the apparatus is given an option as to which annotations the user prefers for the digital representation.

25. A camera for automatically annotating digital images, comprising:

an electronic capture device to capture a digital representation of a scene;

a tag-reader to receive identification data from an information tag device located at the scene;

a memory to store the digital representation and the identification data associated therewith;

an input/output (I/O) device to transfer data between the memory and a communication device, wherein the communication device transfers the identification data to a database, wherein a network address of an annotation provider associated with the information tag device is stored in the database.

26. The camera of claim 25, wherein the communication device includes a program execution device to execute a program, wherein the program to enable communication with the annotation provider to obtain an annotation associated with the information tag device and to annotate the digital representation of the scene with the annotation.

27. The camera of claim 25, wherein the communication device is located within the camera.

* * * * *